US012565156B2

(12) United States Patent
Müller et al.

(10) Patent No.: US 12,565,156 B2
(45) Date of Patent: Mar. 3, 2026

(54) ROOF MODULE HAVING A SEALING ASSEMBLY AND METHOD FOR FIXATING A SEALING ASSEMBLY

(71) Applicant: Webasto SE, Stockdorf (DE)

(72) Inventors: Lorenz Müller, Stockdorf (DE);
Giedrius Mikutis, Stockdorf (DE);
Cédric Langlais, Stockdorf (DE);
Nikolaus Linner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 374 days.

(21) Appl. No.: 18/144,994

(22) Filed: May 9, 2023

(65) Prior Publication Data

US 2023/0365073 A1      Nov. 16, 2023

(30) Foreign Application Priority Data

May 10, 2022    (DE) ..................... 10 2022 111 627.1

(51) Int. Cl.
B60R 11/04      (2006.01)
B29C 45/14      (2006.01)
B60R 11/00      (2006.01)

(52) U.S. Cl.
CPC ........ B60R 11/04 (2013.01); B29C 45/14344 (2013.01); B60R 2011/004 (2013.01); B60R 2011/005 (2013.01)

(58) Field of Classification Search
CPC ... B60R 11/04; B60R 2011/004; B62D 25/06; G01S 17/931; G01S 2013/93273
(Continued)

(56) References Cited

U.S. PATENT DOCUMENTS 12,153,164 B2 *  11/2024  Laverne ................ G01S 17/931
2004/0046415 A1    3/2004  Heselhaus
(Continued)

FOREIGN PATENT DOCUMENTS

DE           10242045 A1    3/2004
DE       102018116702 A1    1/2019
(Continued)

OTHER PUBLICATIONS

Science Magazine; vol. 362; Issue 6538, High-throughput injection molding of transparent fused silica glass. (Year: 2021).*
(Continued)

*Primary Examiner* — Jason S Daniels
(74) *Attorney, Agent, or Firm* — Fitch, Even, Tabin & Flannery, LLP

(57) ABSTRACT

A roof module for forming a vehicle roof on a motor vehicle, the roof module having a panel component, which forms at least sections of a roof cladding of the vehicle roof, and having an opening in which at least one environment sensor is disposed within a casing, the environment sensor being able to transmit and/or receive electromagnetic signals for charting the vehicle environment and being displaceable between a retracted position and an extracted position, wherein the roof module may have a sealing assembly which surrounds the opening and has a sealing area which extends in a movably flexible manner between the panel component and at least one section of the casing and is injection-molded on one side on the panel component and/or the casing.

19 Claims, 2 Drawing Sheets

(58) Field of Classification Search
USPC .............................................. 296/190.1, 210
See application file for complete search history.

(56) References Cited

U.S. PATENT DOCUMENTS

| | | | |
|---|---|---|---|
| 2019/0016306 A1 | 1/2019 | Krishnan | |
| 2019/0210436 A1 | 7/2019 | Frederick | |
| 2020/0086833 A1 | 3/2020 | Frederick | |
| 2020/0114836 A1* | 4/2020 | Day | F16M 11/38 |
| 2022/0169314 A1 | 6/2022 | Huelsen | |
| 2023/0138179 A1* | 5/2023 | Dietl | B62D 25/06 |
| | | | 348/148 |

FOREIGN PATENT DOCUMENTS

| | | | |
|---|---|---|---|
| DE | 102019122186 A1 | 2/2021 | |
| DE | 102019122193 A1 | 2/2021 | |
| DE | 102021115334 A1 * | 12/2022 | G01S 13/931 |

OTHER PUBLICATIONS

Office Action issued in corresponding German Application No. 10 2022 111 627.1; mailed Feb. 11, 2025 ; In German with English translation (6 pages).

* cited by examiner

ROOF MODULE HAVING A SEALING ASSEMBLY AND METHOD FOR FIXATING A SEALING ASSEMBLY

CROSS-REFERENCE TO RELATED APPLICATION

This application claims priority from German Patent Application Number 10 2022 111 627.1, filed on May 10, 2022, 2022, which is hereby incorporated herein by reference in its entirety for all purposes.

FIELD

The invention relates to a roof module according to the preamble of claim 1 and to a motor vehicle having a roof module of this kind. Furthermore, the invention relates to a method for fixating a sealing assembly on a roof module of this kind.

BACKGROUND

Generic roof modules are widely used in vehicle manufacturing. For instance, roof modules are prefabricated as separate functional modules and are delivered to the assembly line having a roof frame structure (which is part of the chassis structure). The roof module at least forms sections of a roof cladding of the vehicle roof, the roof cladding preventing moisture and air flows from entering the vehicle interior. The roof cladding is composed of one or more panel components, which can be made of a stable material, such as painted metal or painted or solid-colored plastic. The roof module can be a part of a fixed vehicle roof or a part of an openable roof sub-assembly.

Furthermore, the development in vehicle manufacturing is increasingly focusing on autonomously and partially autonomously driving motor vehicles. In order to enable the vehicle controller to control the motor vehicle autonomously or partially autonomously, a plurality of environment sensors (e.g., lidar sensors, radar sensors, (multi-)cameras, etc. including other (electrical) components) are employed, which are integrated in the roof module, for example, and which chart the environment surrounding the motor vehicle and determine, for example, a current traffic situation from the acquired environment data. Roof modules which are equipped with a plurality of environment sensors are also known as roof sensor modules (RSM). For this purpose, the known environment sensors transmit and/or receive suitable electromagnetic signals, such as laser beams or radar beams, allowing a data model of the vehicle environment to be generated by suitable signal evaluation and to be used for controlling the vehicle. To protect the environment sensors from harmful environmental influences, such as dampness and air flows, the environment sensors are mostly installed in one or more casings which define a dry area of the roof module in which dampness can enter.

Provided an extraction and retraction of the environment sensor is to be ensured in order to do justice to aesthetic aspects, for example, and to additionally protect the environment sensor in a non-active state from environmental influences, a set of problems pertaining to dampness entering the roof module (and the roof space of the vehicle) and particularly the dry areas of the roof module exists, which must be prevented at all times to ensure the functionality of the environment sensor (or a plurality of environment sensors). In this context, several sealing concepts are known from the state of art, sealing assemblies being fixed, for example inserted on an edge area of the opening in the form of a tube seal, around an opening in which, for example, an environment sensor is disposed so as to be retracted or extracted. The known seal assemblies, however, do not guarantee a complete sealing and often require complex mounting. The known sealing assemblies are often fixed manually and so as to be reversibly detachable. This can lead to leaks on the one hand, which are to be avoided. On the other hand, the known mounting types often require high tolerances which lessens the reliability of the desired sealing effect. Equally, the known mounting options result in high production costs and complicate assembly.

SUMMARY

The object of the invention at hand is therefore to propose a roof module which solves the problems of the state of the art described above and in particular comprises a sealing assembly which allows a reliable sealing of an opening in the panel component even during a retraction and/or extraction of an environment sensor. Particularly preferably, a sealing assembly is to be provided which can be fixed on the roof module as easily and inexpensively as possible.

The object is attained by a roof module according to the teachings of claim 1. Further, the method for fixing a sealing assembly according to claim 16 provides another solution.

Advantageous embodiments of the invention are the subject matter of the dependent claims. Moreover, any and all combinations of at least two features disclosed in the description, the claims, and/or the figures fall within the scope of the invention. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned. In particular, the features mentioned in connection with the roof module relate to the motor vehicle having at least one roof module of this kind and/or to method for fastening a sealing assembly on a roof module of this kind equally or in a correspondingly adapted form.

The roof module according to the invention for forming a vehicle roof on a motor vehicle comprises a panel component which forms at least sections of a roof cladding of the vehicle roof and an opening in which at least one environment sensor is disposed within a casing, the environment sensor being able to transmit and/or receive electro-magnetic signals for charting the vehicle environment. The at least one environment sensor is displaceable between a retracted position and an extracted position, in particular together with the casing in which it is housed. The roof module is characterized in that it comprises a sealing assembly which surrounds the opening and has a sealing area which extends in a movably flexible manner between the panel component and at least one section of the casing and is disposed on one side on the panel component and/or the casing. Particularly preferably, the sealing area is injection-molded on one side on the panel component. Alternatively or additionally (i.e., and/or), the sealing area is preferably injection-molded on the casing.

In particular in the event if the at least one environment sensor is retracted or extracted, it can happen that, for example, rain water or other dampness (liquid) enters the roof module through the opening. In this context, the water can enter an interior within the opening during the movement of the at least one environment sensor, for example, in particular because of high water pressure on a main seal, an occurrence prevented by the provision of the sealing area according to the invention. The leaking liquid can be reliably drained via the sealing assembly according to the invention, meaning a liquid leak in the roof module (e.g., in a dry area, in which the environment sensor is disposed) or the roof space of the vehicle can be prevented. "At least one environment sensor" means the roof module can comprise one or more environment sensors.

An advantage of the roof module according to the invention is that the sealing area is attached, in particular injection-molded, on the panel component and/or the casing. Through this, a manner of fixation is provided which is particularly simple, operationally safe and inexpensive with respect to the state of the art and is advantageous with respect to the hitherto available manual, reversible fixations of sealing areas. In particular, water entering the vehicle as intended by the invention is effectively drained. Hitherto sealing and/or fixing a sealing area of this kind from and/or to a panel component and/or a casing has been difficult and made producing or providing a water-proof sealing area, in particular in the area of its connection to the roof module, complicated. Moreover, the fixation of a sealing area by means of a (support) profile limited possible shapes in the three-dimensional space, as most of the (support) profiles allow only a two-dimensional curve or two-dimensional bend for forming a fixating flange. The injection-molding according to the invention overcomes this disadvantage, as the sealing area can now be injection-molded on the panel component and/or the casing in a highly flexible manner. Preferably, any plastic suitable for injection-molding can be used for this purpose.

Overall, the invention simplifies handling the panel component for the fixation of the sealing area. Moreover, it is possible to automate fixing the sealing area in particular via the use of machinery. This allows realizing a consistent quality of the sealing effect, meaning a sealing functionality of the sealing area is improved with respect to the state of the art. Equally, the number of work steps can be reduced, whereby costs can be effectively reduced. Equally, fixing the sealing area via injection-molding as intended by the invention makes it possible to form the shape of the panel component more complex in the area of the opening too with respect to the state of the art, as constructive limits are no longer required because of previously required connective means, such as fixing flanges. Equally, it is also possible to integrate additional functions and/or shapes, such as (sealing) lips and/or hooks, in the molded connection between the sealing area and the panel component and/or the casing section. For instance, further threaded bushes and/or (mounting) plates, which are required for other functional components in the roof module, can be injection-molded when fixing the sealing assembly.

The roof module according to the invention can form a structural unit in which features for autonomous or partially autonomous driving assisted by driver assistance systems are integrated and which can be placed on a vehicle body shell as a unit by a vehicle manufacturer. Furthermore, the roof module according to the invention can be a purely fixed roof or a roof including a roof opening system. Moreover, the roof module can be configured for use with a passenger car or a utility vehicle. The roof module can preferably be provided as a structural unit in the form of a roof sensor module (RSM), in which the environment sensors are provided, so as to be inserted into a roof frame of a vehicle chassis as a suppliable structural unit.

The environment sensor of the sensor module of the roof module according to the invention can generally be configured in various ways and in particular comprise a lidar sensor, a radar sensor, an optical sensor, such as a camera, and/or the like. Lidar sensors operate in a wavelength range of 905 nm or about 1550 nm, for example. The material of the roof cladding in the see-through area should be transparent to the wavelength range used by the environment sensor and should hence be selected as a function of the wavelength range(s) used by the environment sensor.

In a preferred embodiment, the sealing area is injection-molded on one side on the panel component and/or the casing via a two-component or multi-component injection-molding method. Via the two-component or multi-component injection-molding method, it is possible to overmold an edge area of the sealing area, for instance, in such a manner with the multi-component plastic that a fixation formed in one piece with the panel component and/or the casing is produced. The edge area of the sealing area itself can also be a component of the fixation and in particular be connected in one piece with the panel component and/or the casing. Particularly preferably, the multi-component injection-molding plastic comprises a plastic component of the sealing area and a plastic component of the panel component and/or the casing. This enables an integral installation of the sealing area on the edge of the panel component and/or casing. The two-component or multi-component injection-molding method makes it possible to connect the sealing area in one piece with the panel component and/or the casing. The multi-component injection-molding serves for producing injection-molded areas which consist of two or more, in particular different, plastics. Particularly preferably, the injection-molding method according to the invention comprises at least one plastic component which equals or corresponds to a plastic of the panel component and/or the casing. It is understood that the sealing area can also be installed on the panel component and/or the casing via a one-component injection-molding method if, for example, the sealing area and the panel component and/or the casing comprise the same base plastic.

In a preferred embodiment, the sealing area is injection-molded on one side, in particular in one piece, on the panel component and/or casing via a glass injection-molding method. This is of particular advantage if, for instance, the panel component is made of glass and the sealing area is to be installed on the glass, in particular in one piece.

In a preferred embodiment, the sealing area comprises at least one drain and is designed to collect liquid entering through the opening in the direction of the at least one drain. Particularly preferably, the at least one drain is injection-molded on the sealing area. An advantage of this is that a functionally safe and simple water management is enabled in the event that rain water or other fluid enters the roof module through the opening. The liquid can then be drained via the at least one drain. The surrounding sealing assembly, i.e., the opening disposed around the entire opening without interruption and continuously, makes it possible to always collect leaking liquid in the direction of the at least one drain independently of its leakage point and to drain it from the roof module from there. For this purpose, the sealing assembly has a geometry or shape which allows water to always be directed to the at least one drain independently of its leakage point, viewed around the opening. The location to where the liquid is drained in the vehicle (for example along the vehicle chassis) is generally arbitrary, though it depends on where the environment sensor is disposed in the roof module (viewed in the longitudinal vehicle direction or vehicle width direction). For instance, the water exiting the sealing assembly via the drain can be drained laterally along an A pillar of the vehicle. Generally speaking, the water can be drained along the length, width and/or height of the vehicle. The drain (discharge) is preferably a rigid, tube-shaped fitting, which can be connected to one or more water drains provided on the chassis of the vehicle.

In a preferred embodiment, the sealing assembly comprises two drains which are disposed to the left and right of the environment sensor, preferably mirror-symmetrically, in a viewing direction of an optical axis of the environment sensor. Furthermore, the sealing assembly in this embodiment comprises a funnel-shaped section, which opens into one of the drains, on the left and right of the environment sensor, respectively, in the viewing direction of the optical axis of the environment sensor for collecting the liquid entering circumferentially through the opening. This embodiment is particularly advantageous if the vehicle has a (temporary) inclined position in the longitudinal vehicle direction and/or vehicle width direction, for example. In the exemplary event that the environment sensor is oriented in the longitudinal vehicle direction with its optical axis, water entering through the opening can be drained to the left or right (in the vehicle width direction), depending on the vehicle's inclination with respect to the horizontal.

In other words, in particular because of the arrangement of the environment sensor in the roof, it is preferred if two drains are available (for example, to the left and right of the environment sensor viewed in a longitudinal vehicle direction). In this manner, water can be drained via both drains, which has the advantage, in particular in the event that the vehicle is positioned at an incline (i.e., has an inclination angle with respect to the horizontal), that the liquid collected by the sealing assembly can be drained without interruption. The inclination angle of a vehicle can be 15° to 17° during operation, meaning it must be ensured even at such an inclination that water entering through the opening, for example while retracting the environment sensor to the retracted position, can be drained.

In a preferred embodiment, the sealing assembly comprises another sealing area which is disposed around the opening and is designed to seal the opening in the retracted position of the one environment sensor by abutting the other sealing area against a first counter sealing section of the environment sensor and to seal the opening in the extracted position of the environment sensor by means of abutting the other sealing area against a second counter sealing section of the environment sensor. It is particularly preferred if the other sealing area comprises a tube seal which is disposed in an edge area of the opening and is preferably formed in one piece. The other sealing area therefore preferably forms what is known as a primary seal which is intended to generally prevent dampness from entering through the opening. Seals of this kind are also used in sliding roofs or the like, for example. The other sealing area is inserted or glued or injection-molded on an edge area around the opening or connected thereto in any other manner in a liquid-proof manner, for example. The one-piece design of the other sealing area is particularly advantageous, since thus a surrounding liquid impermeability can be ensured along the entire outer circumference of the opening. Preferably, the tube seal is annular or rectangular (depending on the cross section of the opening). The other sealing area is preferably configured to seal a gap between the environment sensor and the installation opening, the gap being required for constructional reasons, at least in the retracted and in the extracted state of the environment sensor so that liquid cannot enter through the opening.

The first counter sealing section is, for example, formed by a lid part of a casing of the environment sensor surrounding it. In more precise terms, the first counter sealing area is preferably formed by the outer edge area of the plate-shaped lid part of the environment sensor, which preferably abuts against a sealing lip of the other sealing area around the opening in a liquid-proof manner in the retracted state of the environment sensor. The lid part is preferably flush with the roof cladding of the roof module in the retracted state of the environment sensor; thus, it forms a plane surface. The second counter sealing section can also be formed by means of a plurality of individual profiles, at least sections of each of which are disposed on the casing (i.e., not necessarily surrounding the entire casing). The second counter sealing section is designed in such a manner that it preferably abuts against a sealing lip of the other sealing area in the extracted state of the environment sensor in a liquid-proof manner, meaning liquid cannot enter through the opening. The first sealing area and the first and second counter sealing area together form the first (primary) sealing barrier (main seal).

The sealing area preferably forms a secondary sealing barrier which prevents liquid from entering through the opening even when liquid has passed the first sealing barrier. This design has the advantage that, on the one hand, a redundant seal of the opening is allowed, which in particular increases the safety upon sealing. On the other hand, the flexible movability of the sealing area makes moving the environment sensor from the retracted to the extracted state and an uninterrupted seal of the opening possible. In the event that at least sections of the other sealing (viewed around the opening) temporarily loses contact with the first or second counter sealing section upon retraction or extraction of the environment sensor, generally making it possible for water to enter through the opening, the seal can be ensured by the sealing area. This sealing area can flexibly move together with the environment sensor via the one-sided arrangement on the casing of the environment sensor, meaning no loss of the sealing contact occurs.

Preferably, the sealing area is essentially bag-shaped and surrounds the opening without interruption along its entire outer circumference. The sealing area therefore forms a kind of wet area which entirely surrounds the opening. The sealing area thus forms a water-draining cuff around the opening in the roof module. The sealing area is preferably shaped like a bundle-coil-shaped bag or a groove. The term "essentially bag-shaped" is understood to mean that the sealing area is preferably open towards the top (viewed in the roof direction), meaning water entering through the opening can flow into the bag-shaped sealing area.

In a preferred embodiment, the sealing area is made or produced of a flexible, mat-shaped material, preferably of rubber or a liquid-proof textile. The sealing area can be a type of bellows, meaning the flexible movability can be ensured. A cuff made of ethylene propylene diene monomer rubber (EPDM) is conceivable. Material-wise, in particular the liquid impermeability and the flexible movability of the material are advantageous.

Particularly preferably, the sealing area according to the invention is formed like a water skin and thus forms a secondary seal between the panel component and the casing. The sealing area preferably forms a secondary separation plane between the panel component and the casing, meaning no liquid can enter through the opening. In particular a barrier against wind and other environmental influences is formed during the movement (the retraction and extraction of the environment sensor). According to the invention, it is preferred that the water pocket formed by the sealing area is injection-molded on the panel component by means of an injection-molding tool. Moreover, the at least one drain or the water drain tube is particularly preferably injection-molded on the water pocket. According to the invention, a manual mounting of the water pocket is not required. The water pocket or water skin can in fact be simply injection-molded, which can also be performed by machine. This prevents manual mounting errors, thus improving quality.

In a preferred embodiment, the sealing area for collecting the leaking liquid forms sections of the at least one funnel-shaped sealing area which opens in the drain. The sealing area is therefore funnel-shaped or V-shaped or U-shaped on this side on one of the side areas of the opening in a top view. The funnel-shaped or V-shaped or U-shaped area of the sealing area has the drain on its lower end (in the direction of the bottom), the water entering the second sealing area being able to drain from the drain. The sealing area therefore preferably has a funnel-shaped or V-shaped or U-shaped recess in the water skin, which is formed as a cuff. Preferably, the water skin has funnel-shaped or V-shaped or U-shaped recesses on both sides in the viewing direction along the optical axis of the environment sensor. At this point, the description given above on the sealing assembly is referenced. In this manner, the sealing area forms a type of channel which extends around the opening. The channel preferably has a funnel-shaped or V-shaped or U-shaped recess on at least one of the lateral areas of the environment sensor which are oriented parallel to the optical axis of the environment sensor, a depth of the channel, as viewed from the side, preferably changing conically towards the middle towards a deepest point. The drain is disposed at this deepest point.

In a preferred embodiment, the sealing assembly is connected to an edge section of the panel component in a liquid-proof manner along a first edge area. The first edge area of the sealing assembly is preferably an edge area which is disposed at the end and on which the sealing area can be fixed to the panel component, in particular on an interior edge area surrounding the opening.

This embodiment has the advantage from a mounting point of view that the environment sensor can be retrofitted in the roof module and/or in the opening and the sealing area can be fixed to the panel component, in particular on the interior. This embodiment allows a mounting outside and inside the vehicle.

In a preferred embodiment, the sealing area is connected to the casing of the environment sensor in a liquid-proof manner along a second edge area of the sealing area. Particularly preferably, the sealing area is injection-molded in a liquid-proof manner on the casing along the second edge area. The first edge area of the sealing area essentially extends along or corresponds to an outer circumference of the opening. To form the cuff or water skin which are both three-dimensional and surround the opening, the sealing area is disposed on the casing of the environment sensor by its second edge area. Preferably, at least one profile section is disposed or formed on the casing or the components of the casing to fix the second edge area.

The casing can, for example, also comprises several casing sections, i.e., not only designed in a purely box shape but also comprise, for example, another lid section and/or a connective section by means of which the casing is held on a frame structure of the roof structure in a rotatable manner about the rotational axis of the environment sensor.

In a preferred embodiment, the sealing area defines a wet area of the roof module surrounding the opening and forms a separating barrier to a dry area of the roof module in which the environment sensor is disposed. This embodiment in particular highlights that by providing the sealing area, a preferably waterproof seal of the dry area from the wet area can be ensured. This division into a wet area and dry area allows disposing the mechanics required for displacing the environment sensor and other electrical connectors (such as plugs) and overall the environment sensor including its casing in the dry area in which there is absolutely no contact with dampness. This enables foregoing other required "apertures" through a sealing plane (e.g., for connecting a connection device of the environment sensor), as all cables and other components sensitive to liquid can be disposed entirely in the dry area. This prevents other problems and minimizes error proneness. Equally, expensive and more complex (IP classes) which would otherwise be required in a damp area are not necessary.

In a preferred embodiment, the second counter sealing section comprises at least one profile section which is disposed on the environment sensor or rather on the casing of the environment sensor. Preferably, the profile section is disposed so as to surround the casing of the environment sensor and at least sections thereof protrude from there. The profile section preferably serves to connect the second edge area of the second sealing area to the casing of the environment sensor in a secure and liquid-proof manner.

In a preferred embodiment, at least sections of the at least one profile section are formed in such a manner that a preferably consistent sealing contact is present between the first sealing area and the second counter sealing area while the environment sensor is displaced from the retracted position to an extracted position. This design of at least sections of the profile section ensures that the sealing contact to the primary seal (first sealing area to the casing of the environment sensor) is not lost around at least a partial area of the opening even when the environment sensor is moved around its rotational axis. The profile section is preferably designed in this manner in an edge area of the opening extending parallel to the rotational axis of the environment sensor. The design can be attained by a concave, curved shape of the profile section facing away from the casing, the curvature of the shape being able to be derived from the normal distance to the rotational axis of the environment senor. In other words, it is preferred when the sealing contact to the primary seal is not lost around the opening lateral and in the area parallel to the rotational axis of the environment sensor while the environment sensor is retracted or extracted. This is possible in particular since the environment sensor rotates around merely one rotational axis.

In a preferred embodiment, the at least one environment sensor comprises a lidar sensor and/or a radar sensor and/or a camera sensor and/or a multi-camera sensor and/or an ultrasound sensor.

According to the invention, moreover, a vehicle is claimed which comprises at least one roof module according to any embodiment of the invention. The roof module is preferably disposed as a structural unit in the roof area of a vehicle chassis.

Furthermore, the invention relates to a method for fixing a sealing assembly on a roof module, the method comprising at least the following steps: injection-molding the first edge area on the edge section of the panel component, which is provided around the opening, by means of an in particular manually actuated or partially automatic or automatic injection-molding tool; and/or injection-molding the second edge area on the at least one section of the casing of the environment sensor by means of an in particular manually actuated or partially automatic or automatic injection-molding tool. Particularly preferably, the first edge area is injection-molded on the edge section of the panel component and/or the second edge area is injection-molded on at least one section of the casing of the environment sensor via a two-component injection-molding method and/or a glass injection-molding method, whereby the edge area is connected to the edge section of the panel component in one piece and/or the second edge area is connected to the at least one section of the casing in one piece.

Of course, the invention allows using several different injection-molding methods. Hence, the injection-molding method for connecting the sealing area to the panel component can differ from the injection-molding method for connecting the sealing area to the casing at least with regard to one of the used plastic components if, for example, the panel component and the casing are made of differing plastics. Furthermore, the injection-molding method for in particular integrally fixing the drain on the sealing area can differ from the previously mentioned injection-molding method at least with regard to one of the used plastic components.

Of course, the roof module can also comprise several openings, several environment sensors and several sealing arrangements (at least one per opening and environment sensor) without departing from the frame of the invention at hand.

Of course, the embodiments mentioned above and the exemplary embodiments yet to be discussed below can be realized not only individually but also in any combination with each other without departing from the scope of the invention at hand.

BRIEF DESCRIPTIONS OF THE DRAWINGS

Embodiments of the invention are shown schematically in the drawings and are described in the following by means of examples.

DETAILED DESCRIPTION

Figure 1:
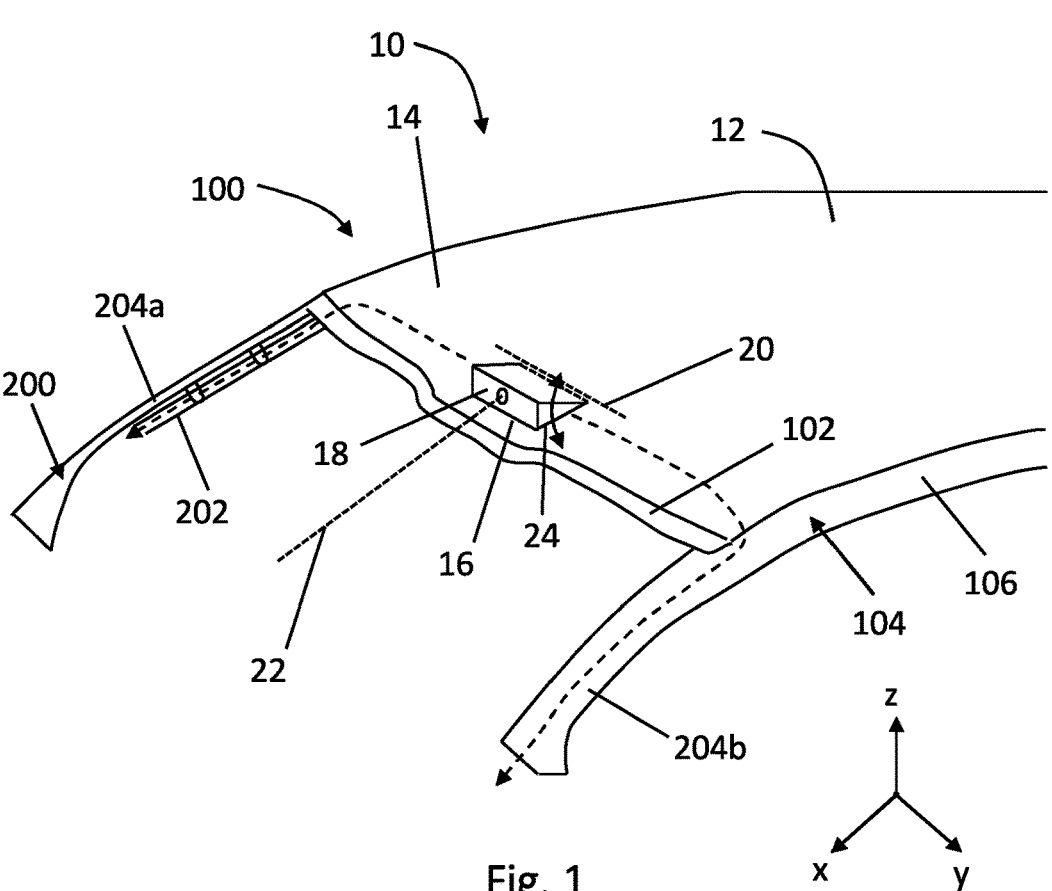
FIG. 1 shows a schematic view of a roof module according to the invention when mounted on a vehicle roof.

In FIG. 1, a vehicle roof 100 is shown which comprises a roof module 10. Roof module 10 comprises a panel component 12 for forming roof cladding 14 of vehicle roof 100 of a vehicle (not shown in its entirety). In a frontal, middle roof area of the vehicle roof 100 or roof module 10, viewed in a longitudinal vehicle direction x, an opening 16 is located in which an environment sensor 18 is disposed. Opening 16 and environment sensor 18 are disposed centrally (viewed in vehicle width direction y) directly behind a front transverse pillar 102, which defines a front header of the vehicle.

Roof module 10 is disposed as a structural unit on a roof frame 104 of a vehicle chassis 200 and for this purpose has its own frame structure by means of which the mounting on roof module 10 on roof frame 104 is ensured. Roof frame 104 is formed by at least two transverse beams 102 (front and rear-side) and at least two longitudinal beams 106 extending in longitudinal vehicle direction x. In other exemplary embodiments, roof module 10 can be realized as a panoramic roof having a see-through area for the passenger area, for example.

Environment sensor 18 (e.g., a lidar sensor) is displaceable and/or rotatable about a rotational axis 20 of the environment sensor between a retracted position and an extracted position. In FIG. 1, environment sensor 18 is shown in the extracted position. Preferably, an electric drive (not shown) allows displacing environment sensor 18 from the retracted position to the extracted position and vice versa.

Environment sensor 18 is configured to chart a vehicle environment around the vehicle by means of electromagnetic signals, for example using an evaluation and control unit. For this purpose, environment sensor 18 is designed to transmit and/or receive signals in a field of view of environment sensor 18, which extends conically around an optical axis 22 of environment sensor 18.

To prevent (rain) water from entering through opening 16, which can lead to damage to environment sensor 18 and/or other electric components and in the interior of the vehicle, roof module 10 has a sealing assembly 24, as intended by the invention. When retracting and/or extracting environment sensor 18, water may possibly enter between environment sensor 18 and opening 16 (i.e., in an edge area) because of the rotational movement about rotational axis 20 of environment sensor 18. To drain this leaking water, sealing assembly 24 is designed to collect water entering through opening 16 in such a manner that it can be drained or discharged from the vehicle preferably on the left and right (viewed in longitudinal vehicle direction x) via drain channels 202 provided in beams 204a, 204b of vehicle chassis 200. In FIG. 1, this water drainage is indicated by two dashed arrows extending along beams 204a, 204b, one of the drain channels 202 being covered by pillar 204a, 204b. Beams 204a, 204b can be an A pillar of the vehicle, for example, while also being able to be a B, C and/or D pillar in other embodiments.

To collect the water entering through opening 16, sealing assembly 24 comprises at least one funnel-shaped section 26, which opens into a drain 28 at its tapering end. Funnel-shaped section 26 extends parallel to longitudinal vehicle direction x on both sides (to the left and right of environment sensor 18) in the event that environment sensor 18 is disposed in a front area of the vehicle and is oriented in longitudinal vehicle direction x by means of its optical axis 22. In the event of a lateral arrangement of environment sensor 18, i.e., an orientation of optical axis 22 of environment sensor 18 along vehicle width direction y, the at least one funnel-shaped section 26 is preferably disposed parallel to vehicle width direction y.

Figure 2:
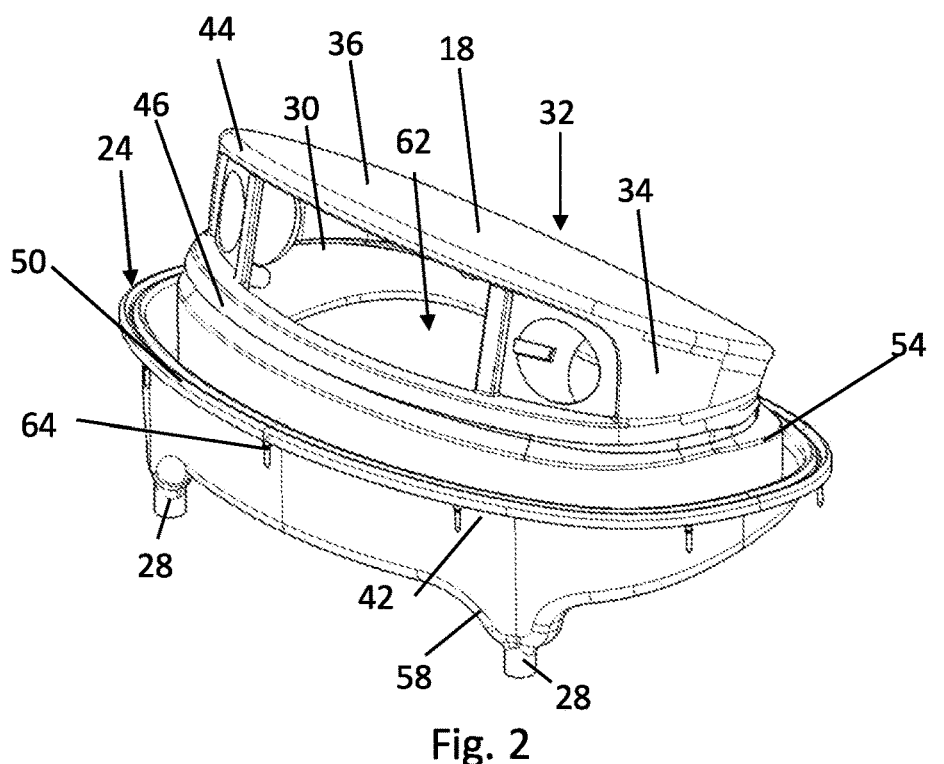
FIG. 2 shows a schematic view of an environment sensor having a sealing assembly in an extracted state.

FIG. 2 shows an environment sensor having sealing assembly 24. Environment sensor 18 is shown in the extracted position. See-through area 30 is designed such that it is transparent for the wavelength range used by environment sensor 18.

Environment sensor 18 comprises a casing 32 having a sensor casing 34, in which environment sensor 18 is disposed, and a lid part 36. Lid part 36 of casing 32 is fixed to casing 32 of environment sensor 28 via one or more profiles. In the retracted position of environment sensor 18, lid part 36 is flush with roof cladding 14. Environment sensor 18 is rotatably mounted on a support structure of roof module 10 around rotational axis by means of casing 32 or rather by means profiles fixed to the casing.

Figure 3:
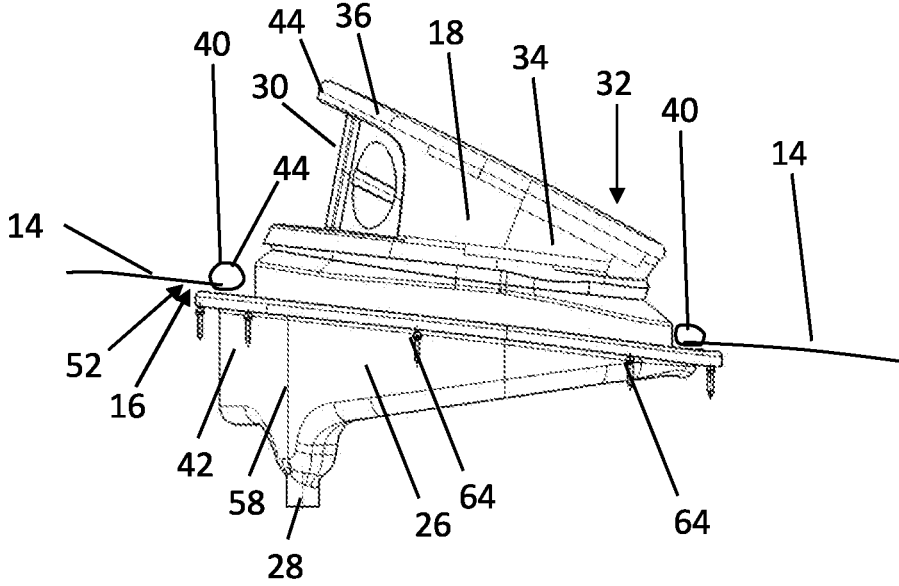
FIG. 3 shows a side view of the environment sensor shown in FIG. 3 in an extracted state.

Sealing assembly 24 surrounding opening 16 has a sealing area 40 (referred to as "other sealing area" in the claims and preceding description) and a sealing area 42. Other sealing area 40 is designed as a tube seal (see schematic FIG. 3). The tube seal is inserted in roof cladding 14 on an edge area surrounding opening 16. Other sealing area 40 serves as a primary sealing barrier for sealing a gap between opening 16 and casing 32 of environment sensor 18, the gap being present out of constructional reasons.

Figure 4:
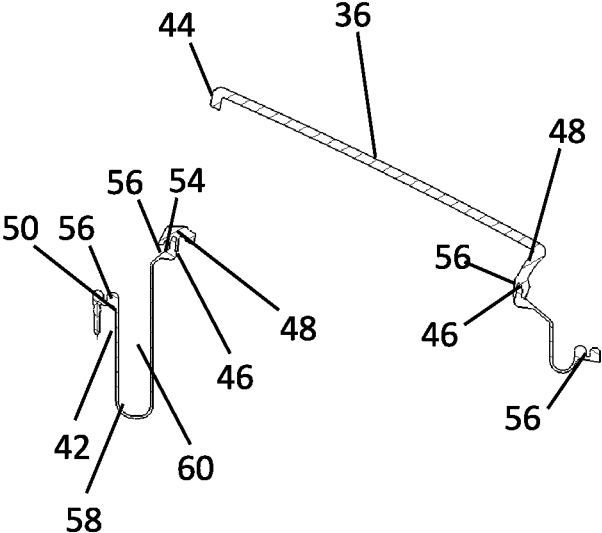
FIG. 4 shows a detailed view of a sealing assembly.

Other sealing area 40 is designed to seal opening 16 in the retracted position of environment sensor 18 by means of abutting first sealing area 40 (i.e., by abutting at least one sealing lip of the tube seal) against a first counter sealing section 44 of environment sensor 18 (see FIGS. 3 and 4) and to seal opening 16 in the extracted position of environment sensor 18 by means of abutting sealing area 40 (i.e., by abutting at least one sealing lip of the tube seal) against a second counter sealing section 46 of environment sensor 18. First counter sealing section 44 is formed by an edge surrounding lid part 36. Second counter sealing section 46 is formed by a profile section 48 which is disposed on sensor casing 34 of environment sensor 18 preferably so as to be circumferential. The geometric shape of profile section 48 can differ along the circumference of sensor casing 34 (see schematic FIG. 4). For instance, the at least one profile section 48 can be shaped in such a manner on a sensor casing area extending parallel to rotational axis 20 of environment sensor 18 that a consistent sealing contact is present between sealing area 40 and second counter sealing section 46, i.e., profile section 48 of this area, when displacing environment sensor 18 from the retracted position to the extracted position. For this purpose, sections of profile section 48 can be concave (in the direction facing away from sensor casing 34). On the side areas of sensor casing 34 (parallel to optical axis 22 of environment sensor 18), the profile section can be formed at an acute angle of attack to sensor casing 34 (to a vertical) so that the sealing contact between first sealing area 40 and second counter sealing section 46 is preferably not lost in this lateral area when environment sensor 18 is retracted and extracted.

Sealing area 42 is connected to an edge section 52 of panel component 12 along a first edge area 50 of sealing area 52. Edge section 52 is preferably a panel section of panel component 12 which extends around the opening. Sealing area 42 is injection-molded on edge section 52 by means of its first edge area 50 (see reference numeral 56). Sealing area 42 is injection-molded to casing 32, more precisely on profile section 48 which is disposed on the casing, along a second edge area 54 of sealing area 42 (see reference numeral 56). Sealing area 42 is made of flexible, mat-shaped material, preferably made of rubber or a liquid-proof textile, and is shaped like a water skin 58 in the present case. Water skin 58 surrounds opening 16 as a closed barrier or cuff. Sealing area 42 forms at least sections of the at least one funnel-shaped section 26 for collecting the leaking liquid, funnel-shaped section 26 opening into drain 28 in each instance. In the present case, sealing area 42 forms funnel-shaped section 26 on the left and right (viewed in longitudinal vehicle direction x) in each instance, funnel-shaped section 26 opening into drain 28 in each instance (see FIG. 2). The at least one drain 28 is injection-molded on the sealing area, in particular at its deepest point.

The closed cuff of sealing area 42, which is designed as a water skin 58, allows defining a secondary sealing barrier, which prevents liquid from leaking into the interior of roof module 10, where environment sensor 18 is disposed, even when the primary sealing barrier (first sealing area 40) does not seal off. Thus, sealing area 42 defines a wet area 60 of roof module 10 surrounding opening 16 and acts as a separating barrier to a dry area 62 of roof module 10, where environment sensor 18 is disposed. In this dry area 62, electrical connections of environment sensor 18 are disposed. In addition, the injection-molding allows including other components, such as plugs, pins, hooks, lips and/or clamps in the injection-molding 56. Components of this kind are schematically referred to with reference numeral 64.

The invention claimed is:

1. A roof module for forming a vehicle roof on a motor vehicle, the roof module having:
  a panel component, which forms at least sections of a roof cladding of the vehicle roof, and having an opening in which at least one environment sensor is disposed within a casing, the environment sensor being able to transmit and/or receive electromagnetic signals for charting the vehicle environment and being displaceable between a retracted position and an extracted position,
  wherein the roof module comprises a sealing which surrounds the opening and has a sealing area which extends in a movably flexible manner between the panel component and at least one section of the casing and is fixed on one side on the panel component and/or the casing; and
  wherein the sealing assembly comprises another sealing area which is disposed so as to surround the opening and is designed to seal the opening in the retracted position of the at least one environment sensor by abutting the other sealing area against a first counter sealing section formed on the casing and to seal the opening in the extracted position of the at least one environment sensor by abutting the other sealing area against a second counter sealing section formed on the casing.

2. The roof module according to claim 1, wherein the sealing area is injection-molded on one side on the panel component and/or the casing.

3. The roof module according to claim 2, wherein the sealing area is injection-molded in one piece on one side on the panel component and/or the casing via a two-component or multi-component injection-molding method.

4. The roof module according to claim 1, wherein the sealing area is injection-molded in one piece on one side on the panel component via a glass injection-molding method.

5. The roof module according to claim 1, wherein the sealing area comprises at least one drain and is designed to collect liquid entering through the opening in the direction of the at least one drain.

6. The roof module according to claim 5, wherein the at least one drain is injection-molded on the sealing area.

7. The roof module according to claim 1, wherein the sealing area is essentially bag-shaped and is formed so as to surround the opening.

8. The roof module according to claim 7, wherein the sealing area defines a wet area of the roof module surrounding the opening and forms a separation barrier to a dry area of the roof module in which the environment sensor is disposed.

9. The roof module according to claim 1, wherein the sealing area is made of a flexible, mat-shaped material made of rubber or a liquid-proof textile.

10. The roof module according to claim 1, wherein the sealing area is designed in the form of a water skin.

11. The roof module according to claim 1, wherein the sealing area has a first edge area which is injection-molded on an edge section of the panel component, which is provided around the opening, so as to be liquid-proof by an injection-molding tool.

12. The roof module according to claim 11, wherein the sealing area has a second edge area which is injection-molded on the at least one section of the casing of the environment sensor so as to be liquid-proof.

13. A method for fixating a sealing assembly on a roof module according to claim 12, the method comprising at least the following steps: injection-molding the first edge area on the edge section of the panel component, which is provided around the opening, by a manually actuated or partially automatic or automatic injection-molding tool; and/or injection-molding the second edge area on the at least one section of the casing of the environment sensor by a manually actuated or partially automatic or automatic injection-molding tool.

14. The method according to claim 13, the injection-molding of the first edge area on the edge section of the panel component and/or the injection-molding of the second edge area on the at least one section of the casing of the environment sensor taking place via a two-component or multi-component injection-molding method and/or a glass injection-molding method whereby the edge area is connected to the edge section of the panel component and/or the second edge area is connected to the at least one section of the casing in one piece.

15. The roof module according to claim 1, wherein the at least one environment sensor is rotatable about a rotational axis between the retracted position and the extracted position.

16. The roof module according to claim 1, claims, wherein the at least one environment comprises a lidar sensor and/or a radar sensor and/or a camera sensor and/or a multi-camera sensor and/or an ultrasound sensor.

17. A motor vehicle, comprising a roof module according to claim 1.

18. A roof module for forming a vehicle roof on a motor vehicle, the roof module having:

a panel component, which forms at least sections of a roof cladding of the vehicle roof, and having an opening in which at least one environment sensor is disposed within a casing, the environment sensor being able to transmit and/or receive electromagnetic signals for charting the vehicle environment and being displaceable between a retracted position and an extracted position, wherein the roof module comprises a sealing which surrounds the opening and has a sealing area which extends in a movably flexible manner between the panel component and at least one section of the casing and is fixed on one side on the panel component and/or the casing;

wherein the sealing assembly comprises another sealing area which is disposed so as to surround the opening and is designed to seal the opening in the retracted position of the at least one environment sensor by abutting the other sealing area against a first counter sealing section formed on the casing and to seal the opening in the extracted position of the at least one environment sensor by abutting the other sealing area against a second counter sealing section formed on the casing; and wherein the other sealing area comprises a tube seal which is disposed in an edge area of the opening and is made in one piece.

19. A roof module for forming a vehicle roof on a motor vehicle, the roof module having:

a panel component, which forms at least sections of a roof cladding of the vehicle roof, and having an opening in which at least one environment sensor is disposed within a casing, the environment sensor being able to transmit and/or receive electromagnetic signals for charting the vehicle environment and being displaceable between a retracted position and an extracted position, wherein the roof module comprises a sealing which surrounds the opening and has a sealing area which extends in a movably flexible manner between the panel component and at least one section of the casing and is fixed on one side on the panel component and/or the casing; and wherein the sealing area forms at least sections of a funnel-shaped section, which flows into the drain for collecting the leaking liquid.

* * * * *